United States Patent [19]

Uchida et al.

[11] Patent Number: 4,495,525

[45] Date of Patent: Jan. 22, 1985

[54] MAGNETIC VIDEO REPRODUCING APPARATUS HAVING STILL PICTURE REPRODUCING FUNCTION

[75] Inventors: Ryohei Uchida, Kobe; Toshifumi Fujii, Nagaokakyo, both of Japan

[73] Assignee: Mitsubishi Denki Kabushiki Kaisha, Tokyo, Japan

[21] Appl. No.: 384,670

[22] Filed: Jun. 3, 1982

[51] Int. Cl.³ ............................................. H04N 5/782
[52] U.S. Cl. .................................... 360/10.3; 358/340
[58] Field of Search .................... 360/10.1, 10.3, 38.1; 358/336, 340

[56] References Cited

U.S. PATENT DOCUMENTS 3,662,101  5/1972  Segerstrom ........................ 360/10.3

OTHER PUBLICATIONS

"Microprocessor Controlled Variable Play-Back Speed System for Video Tape Recorder", IEEE Transactions on Consumer Electronics, vol. CE-26, Feb., 1980, pp. 121-128.

*Primary Examiner*—Robert L. Richardson

*Attorney, Agent, or Firm*—Lowe, King, Price & Becker

[57] ABSTRACT

A magnetic video reproducing apparatus employing a well-known rotational two-head system, a helical scan system and an azimuth system comprises a position detecting means for detecting the positions of the two heads and a dropout detecting means for detecting a dropout of the reproduced signal output from the two heads. A time difference detecting circuit is provided for detecting a time difference between the output from the position detecting means and the output from the dropout detecting means. A time period converting circuit is also provided for converting the time difference detected output to an output signal of a time period associated with the time difference output. A driving circuit is provided for driving a capstan shaft driving motor. The time period converting circuit is adapted such that the time period of the output therefrom may cause the capstan shaft driving motor to be driven so that the dropout timing and hence a noise zone on the screen may coincide with the change over between the two heads, whereby a noise zone due to a dropout of the reproduced signal comes to the upper or lower end of the screen.

8 Claims, 10 Drawing Figures (a) CHANGE OVER (b) DROPOUT (a) DRIVE SIGNAL (b) FORWARD DRIVE T₁
REVERSE BRAKE T₂

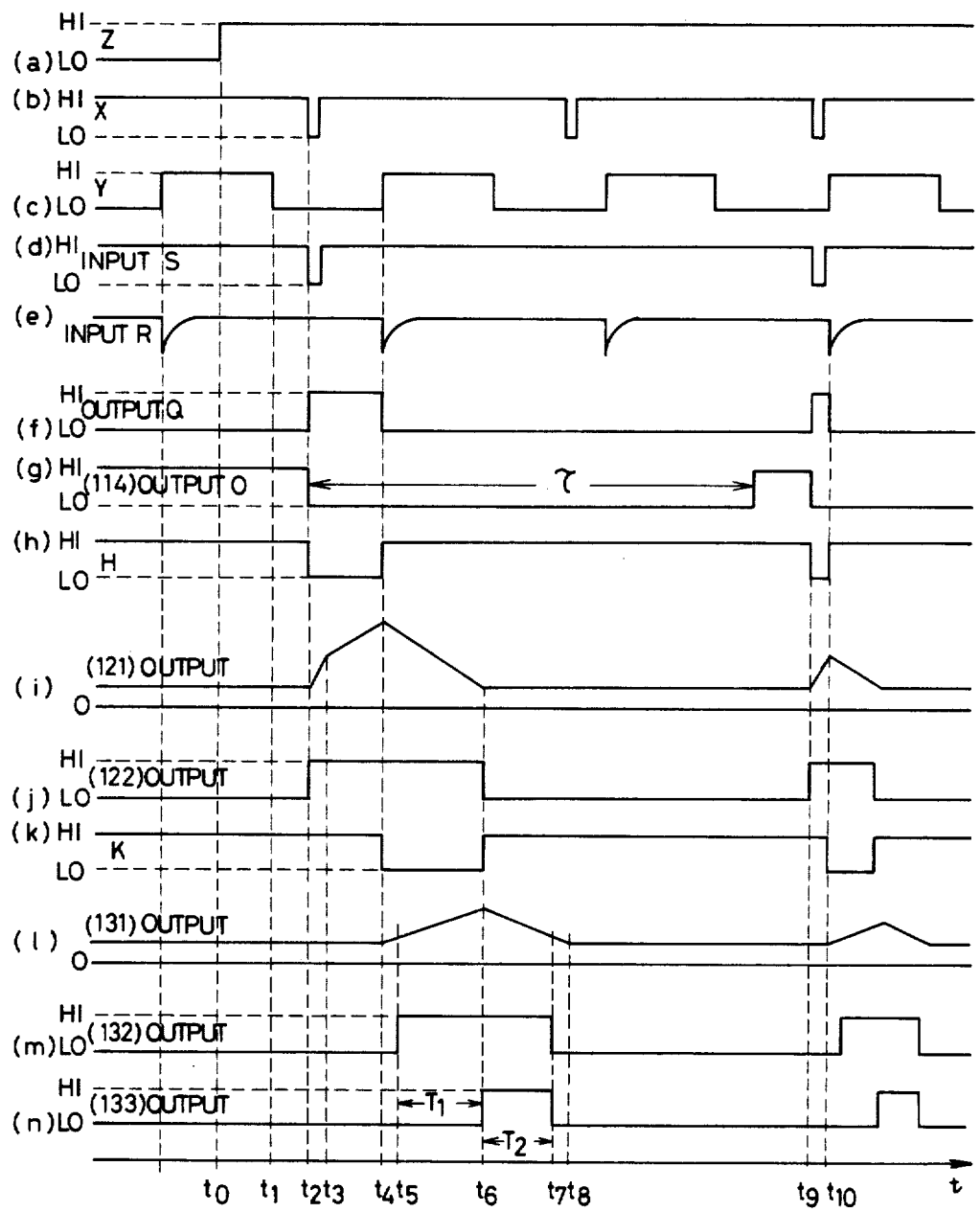

MAGNETIC VIDEO REPRODUCING APPARATUS HAVING STILL PICTURE REPRODUCING FUNCTION

BACKGROUND OF THE INVENTION

1. Field of the Invention

The present invention generally relates to a magnetic video reproducing apparatus having a still picture reproducing function. More specifically, the present invention relates to an improvement in a magnetic video reproducing apparatus employing a rotational plural-head system, a helical scan system and an azimuth system and having a still picture reproducing function.

2. Description of the Prior Art

A magnetic video tape recording/reproducing apparatus for home use so far proposed and put into practical use typically employs a rotational two-head system, a helical scan system and an azimuth system. By a rotational two-head system is typically meant a system in which two video heads are provided at the directly opposite positions on the circumference of a rotating drum spaced apart by 180° from each other. By a helical scan system is typically meant a system in which a magnetic tape is made to travel in an oblique direction with respect to the rotational direction of the video heads. By an azimuth system is typically meant a system in which the gap directions of the above described two heads are each afforded a different angle so that the gap corresponding directions on the recorded tracks recorded by the above described two heads on a magnetic tape may be different and hence may intersect each other. The above described rotational two-head system, helical scan system and azimuth system have been fully described in, for example, U.S. Pat. No. 3,925,810 issued Dec. 9, 1975 to Yoshio Ishigaki et al; U.S. Pat. No. 3,812,523 issued May 21, 1974 to Hisaaki Narahara; U.S. Pat. No. 4,012,771 issued Mar. 15, 1977 to Yoshio Ishigaki et al; U.S. Pat. No. 3,918,085 issued Nov. 4, 1975 to Toshihiko Numakura et al; and U.S. Pat. No. 4,079,412 issued Mar. 14, 1978 to Yoshiteru Kosaka. Since the above described three systems constitute the background of the present invention, the above referenced U.S. patents are herein incorporated by reference thereto.

A still picture reproducing function for use in such a magnetic video tape recording/reproducing apparatus has also been proposed and put into practical use. One conventional approach to shift from an ordinary reproducing mode to a still picture reproducing mode in such magnetic video reproducing apparatus is to obtain some signal from a magnetic tape such as to read a control signal recorded at a position separate from that for a picture signal and to stop a capstan shaft for feeding a magnetic tape in a longitudinal direction within a predetermined period of time. Another conventional approach to shift from an ordinary reproducing mode to a still picture reproducing mode in such a magnetic video tape recording/reproducing apparatus is to confirm that a noise band on the screen has come off the position corresponding to the vertical blanking period to pulse drive, one or several times, a capstan shaft driving motor by a predetermined width, so that a noise band may be expelled from the screen. However, the first mentioned approach involves a disadvantage in that the characteristics of castan shaft driving motors are not uniform and in addition the position of a control signal becomes different depending on the characteristic of a magnetic video tape recording/reproducing apparatuses, so that it is not assuredly guaranteed that always a noiseless still picture is attained when a tape is stopped on the occasion of a still picture reproducing mode. On the other hand, the second mentioned approach also involves a disadvantage in that more time is required to remove a noise band from the screen, which makes viewers worry about the existence of a noise band.

SUMMARY OF THE INVENTION

Briefly described, the present invention comprises a magnetic video reproducing apparatus employing a rotational plural-head system, a helical scan system and an azimuth system, comprising position detecting means for detecting the positions of plural magnetic heads, dropout detecting means for detecting a dropout of a reproduced signal output from the plural magnetic heads, and control means responsive to the outputs from the position detecting means and the dropout detecting means for driving capstan driving means such that a dropout timing may be close to a change-over timing of the plural magnetic heads. Preferably, the control means comprise time difference detecting means reponsive to the position detecting means and the dropout detecting means for detecting a time difference between the outputs from the position detecting means and the dropout detecting means, time period converting means responsive to the time difference detecting means for converting the time difference detected output to an output signal of a time period associated with the time difference detected output, and driving means for driving the capstan driving means as a function of the output from the time period converting means. More preferably, the driving means comprises a driving signal generating circuit for generating a forward driving signal for driving the capstan driving means in the forward direction and a reverse braking signal for reverse braking the casptan driving means, and a driving circuit responsive to the forward driving signal and the reverse braking signal for forward driving and reverse braking the capstan driving means. As a result, according to the present invention, in a still picture reproducing mode a magnetic tape is first brought to a stop and the magnetic tape is then moved in a very short period of time so that a noise band appearing on the screen may be brought to the position corresponding to the vertical blanking period, whereby a still picture without a noise band is immediately reproduced on the occasion of a still picture reproducing mode.

Accordingly, a principal object of the present invention is to provide a magnetic video reproducing apparatus employing a rotational plural-head system, a helical scan system and an azimuth system, which can eliminate a noise band on a screen within a very short period of time by adaptably adjusting a driving amount of a capstan shaft depending on the position of a noise band appearing on the screen on the occasion of a still picture reproducing mode.

Another object of the present invention is to provide a magnetic video reproducing apparatus employing a rotational plural-head system, helical scan system and an azimuth system and having a still picture reproducing function, which is capable of removing a noise band quickly from a television screen through a signal operation of driving a capstan shaft driving motor as a function of a time period signal obtained through conversion from a signal representing the position of the noise band, after the magnetic tape to be reproduced is brought to a stop.

Those objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a graph showing waveforms of the electrical signals at various portions in the FIG. 5 diagram;

DESCRIPTION OF THE PREFERRED EMBODIMENTS

Figure 1A:
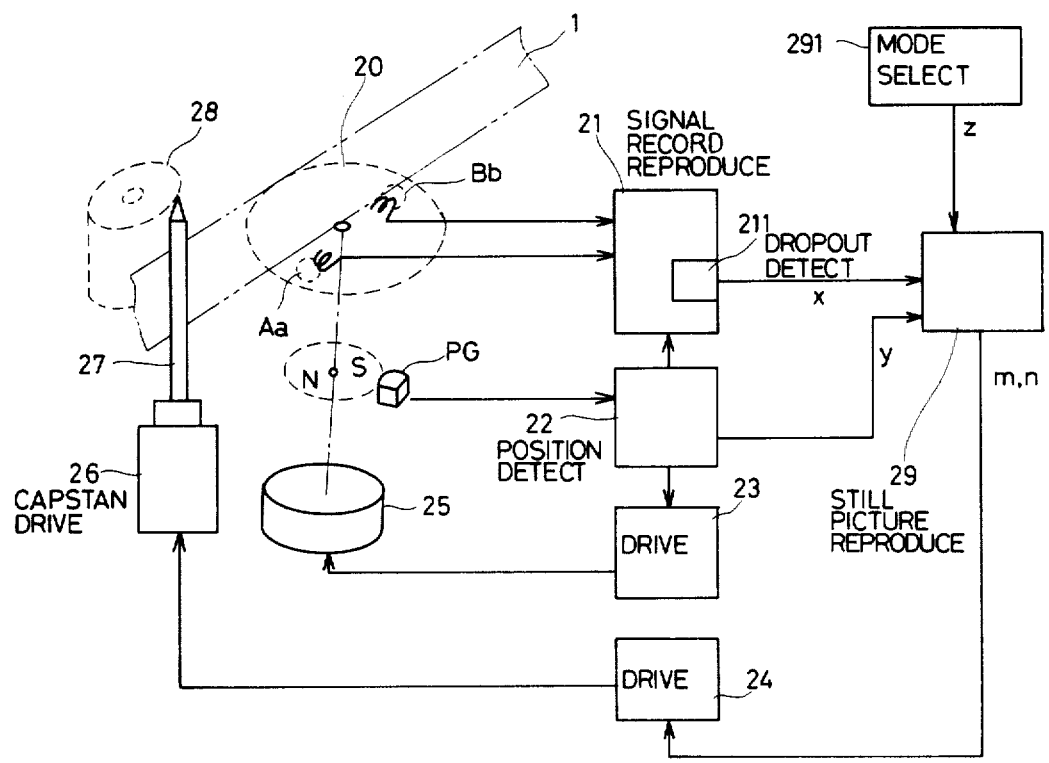
FIG. 1A is a block diagram of a magnetic video tape recording/reproducing apparatus in accordance with the present invention.

FIG. 1A is a block diagram showing a magnetic video tape recording/reproducing apparatus in accordance with the present invention. Referring to FIG. 1, a pinch roller 28 and a capstan shaft 27 are provided so that a magnetic tape 1 may be transferred as the capstan shaft 27 is rotated. A first and second magnetic heads Aa and Bb, respectively, are provided at the directly opposite positions on the circumference of a rotating drum spaced apart by 180° from each other to perform a so-called helical scanning operation with respect to the magnetic tape 1 and the loci of the first and second magnetic heads Aa and Bb are shown by the dotted line. For the purpose of a helical scanning operation, the magnetic tape 1 is adapted to travel around the drum in an oblique direction. The output terminals of the magnetic heads Aa and Bb are coupled to a signal recording/reproducing apparatus 21. The signal recording/reproducing apparatus 21 comprises therein a well-known dropout detecting circuit 211 for the purpose of detecting a dropout of the reproduced signal. The rotational shaft of the magnetic heads Aa and Bb is directly coupled to a motor 25, which is adapted to be driven by a driving circuit 23. Two magnets are provided onto the above described rotational shaft and a magnetic head PG serving as a pulse generator is provided so as to be faced to the above described two magnets. The output of the magnet is coupled to a position detecting circuit 22. Thus, the two magnets and the magnetic head PG constitute a position sensor of the position detecting circuit 22. The signal output from the position detecting circuit 22 is applied to the above described signal recording/reproducing circuit 21 as a change-over signal for performing a change-over between the two magnetic heads Aa and Bb. To that end, the positions of the two magnets to be detected by the magnetic head PG are selected so that the same may have a predetermined positional relation with the previously described magnetic heads Aa and Bb. The casptan shaft 27 is coupled to a capstan shaft driving motor 26. The capstan shaft driving motor 26 is connected so that the same may be driven by a driving circuit 24. Since the embodiment shown employs a direct drive structure, the motor output shaft 27 of the capstan shaft driving motor 26 constitutes a capstan shaft.

The FIG. 1 embodiment comprises a still picture reproduction controlling circuit 29 in accordance with the present invention. The still picture reproduction controlling circuit 29 is connected to receive a dropout signal x obtained from the dropout detecting circuit 211 included in the signal recording/reproducing circuit 21 on the occasion of a reproduction mode. The still picture reproduction controlling circuit 29 is also connected to receive a head change-over signal y obtained from the position detecting circuit 22. The still picture reproduction controlling circuit 29 is further connected to receive a still picture reproducing mode signal z obtained from a mode selector 291. The still picture reproduction control circuit 29 is structured to be responsive to the dropout signal x, the head change-over signal y and the sill reproduction mode signal z to provide predetermined driving signals m and n to the motor driving circuit 24, as to be more fully described subsequently.

Figure 1B:
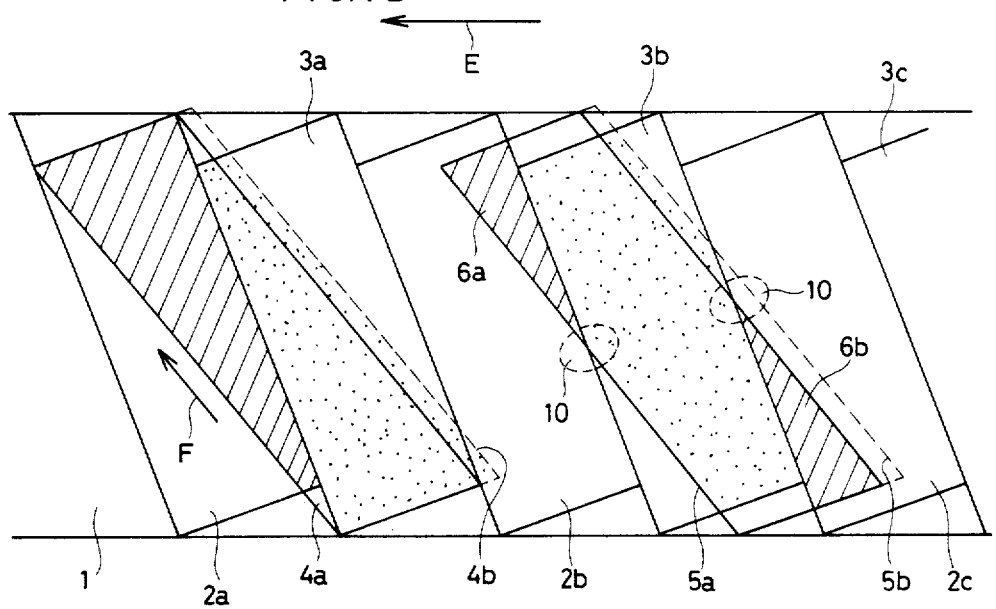
FIG. 1B is a view showing a relation between the video tracks formed when a picture signal is recorded on a magnetic tape and loci of the reproducing heads on the occasion of a still picture reproducing mode.
Figure 2:
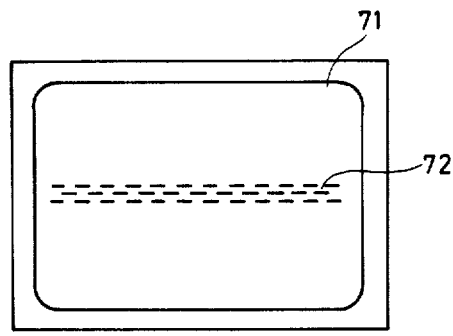
FIG. 2 is a view showing a television screen on which a noise band appears.

FIG. 1B is a view showing a relation between the video tracks formed when a picture signal is recorded on a magnetic tape and the loci of the reproducing heads on the occasion of a still picture reproduetion mode. Referring to FIG. 1B, the reference numeral 1 denotes a magnetic tape and a reference character E denotes a tape travel direction of the magnetic tape 1. The tracks as recorded by the first magnetic head having a first predetermined azimuth angle are denoted as 2a, 2b and 2c. The tracks as recorded by the second magnetic head having an azimuth angle different from that of the first magnetic head are denoted as 3a, 3b and 3c. Now it is assumed that the track width of the tracks 2a, 2b and 2c and that of the tracks 3a, 3b and 3c are the same, the width of the first magnetic head is approximately the same as the track width, and the width of the second magnetic head is slightly wider than the track width. The reference character F denotes a travel direction of the first and second magnetic heads on the occasion of the still picture reproduction mode. Referring to FIG. 1B, the reference characters 4a and 4b show the loci of the first and second magnetic heads which have come to desired positions where no noise band appears on the television screen inasmuch as a level decreasing portion of the picture signal on the occasion of a still picture reproduction mode has come to the end portion of the tracks. Assuming that the loci of the first and second magnetic heads on the occasion of a still picture reproducing mode have come as shown as 5a and 5b in FIG. 1B, then a level decreasing portion of the reproduced picture signal obtained from the first magnetic head comes apart from the upper end or the lower end of the magnetic tape 1 and hence comes to the vicinity of the center 10. In such a situation, a noise band 72 appears on the television screen 71, as shown in FIG. 2. The reason is that when reproduction is made by the first magnetic head the first magnetic head traces the locus 5a to pick up a signal at the portion 6b and the portion 6a, in which case a signal level becomes little at the portions denoted as 10, with the result that a picture signal is not large enough to be a reproduced signal and a noise band consequently appears on the screen. At that time a dropout signal is obtained by the dropout signal detecting circuit 211.

Figure 3:
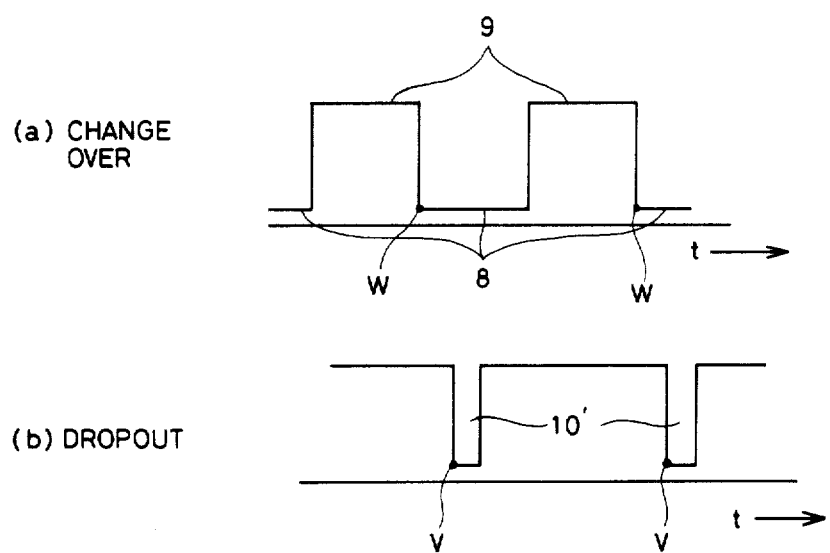
FIG. 3 consisting of (a) and (b) is a graph showing a change-over of the first and second magnetic heads and a dropout signal.

FIG. 3 is a graph showing a change-over of the first and second magnetic heads and a dropout signal obtained from the dropout signal detecting circuit. Referring to FIG. 3, the curve (a) shows a change-over signal for a change over of the first and second magnetic heads, in which the low level signal 8 and the high level signal 9 each represent a reproduction period by the first and second magnetic heads, respectively, with the abscissa representing the time t, and the waveform (b) shows a dropout detected pulse 10' which corresponds to a noise band appearing on the television screen. A circuit for detecting a dropout when a reproduced signal level becomes lower than a predetermined level is well-know to those skilled in the art.

It is appreciated that when the magnetic tape 1 is moved to the position where the head loci come as shown as 4a and 4b in FIG. 1B so that the position of the dropout pulse 10' may be moved, a still picture without a noise band appearing thereon can be attained. When the magnetic tape 1 is brought to a stop from an ordinary tape travelling state, a time difference between the time point W of a change over from the second magnetic head to the first magnetic head and the time point V of the fall of the dropout pulse 10' is not consistent for each stop of the tape. Therefore, in order to expel a noise band from the television screen through a single operation of the capstan shaft driving, it is necessary to adaptably adjust the pulse width of a pulse being applied to the capstan shaft driving motor 26.

Figure 4A:
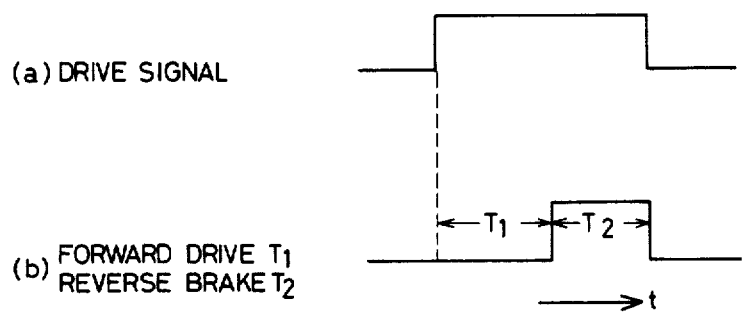
FIG. 4A is a graph showing a driving signal and a time period for forward driving and reverse braking.
Figure 4B:
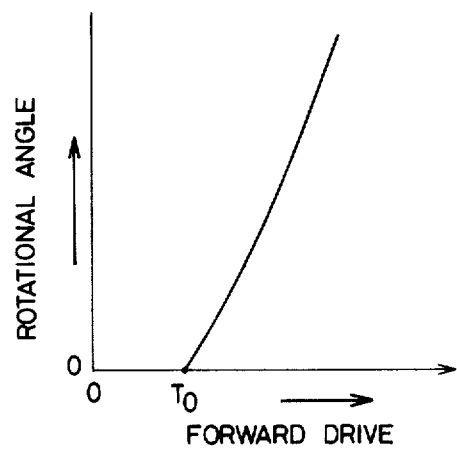
FIG. 4B is a graph showing a relation between the rotational angle of the capstan motor and the forward driving time.

FIGS. 4B and 4B are graphs showing the characteristics of the direct current motor 26 when the same is driven. More specifically, referring to FIG. 4A, the curve (a) shows a driving signal and the curve (b) shows a change-over signal for forward driving and reverse braking. Assuming that a forward driving time is T1 and a reverse braking time is T2, FIG. 4B is a graph showing a relation between the time period T1 for driving the motor and the rotational angle $\theta$ of the motor. As seen from these figures, when the time T1 is smaller than a predetermined value T0, the direct current motor does not operate due to a static friction torque of the motor shaft. On the other hand, in the dynamic range the rotational angle $\theta$ and the time T1 are in approximate linear relation. Meanwhile, the reverse braking time T2 is defined as a time period in which the motor is brought to a complete stop. The position on the television screen which corresponds to a dropout is detected in terms of the time base through convertion thereto. Accordingly, referring to FIG. 3, detection is first made of a time difference between the time point W of a change over from the second magnetic head to the first magnetic head and the time point V of the fall of the dropout pulse and then the above described time difference is properly converted to provide a driving signal, which includes a forward driving signal and a reverse braking signal, which are then applied to the direct current motor, so that a noise band appearing on the television screen may be removed through a single driving operation of the capstan shaft.

Figure 5:
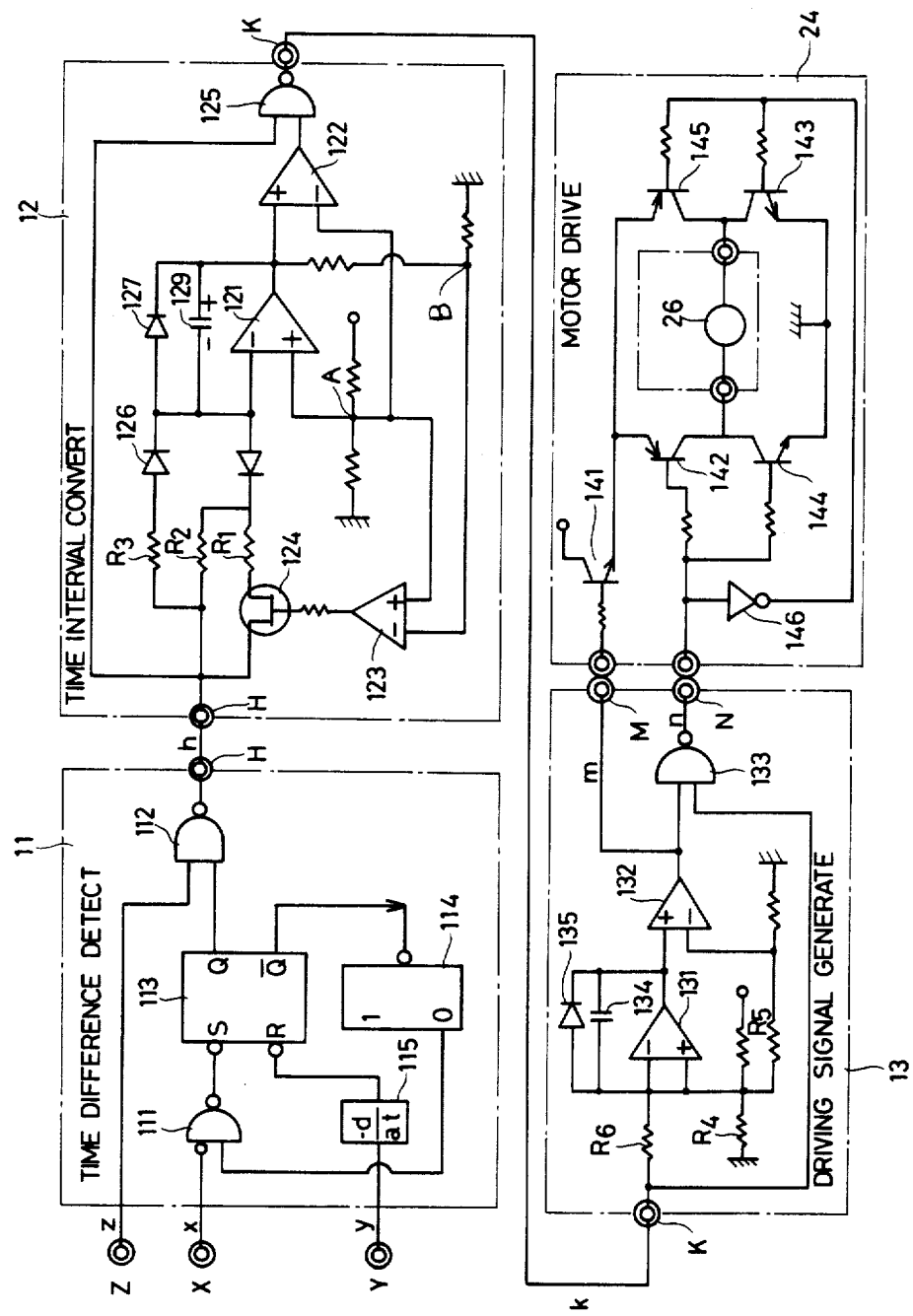
FIG. 5 is a schematic diagram of the still picture reproduction controlling circuit and the driving circuit.

FIG. 5 is a schematic diagram of the still picture reproduction controlling circuit 29, the motor driving circuit 24 and the direct current motor 26. First referring to FIG. 5, the still picture reproduction controlling circuit 29 shown in FIG. 1 comprises a time difference detecting circuit 11, a time period converting circuit 12 and a driving signal generating circuit 13. The time difference detecting circuit 11 is connected to receive a dropout signal x obtained from the signal recording/reproducing apparatus 21, a head change-over signal y obtained from the position detecting circuit 22 and a still picture reproduction mode signal z obtained from the mode selector 291 through terminals X, Y and Z and is also connected to provide a time difference detected signal h through an output terminal H. The time difference detecting circuit 11 basically comprises a gate 111, a negative differentiation circuit 115, a flip-flop 113, a one shot multivibrator 114 and a gate 112. The still picture reproduction mode signal z is selected to assume the high level when a noiseless still picture is required. The time period converting circuit is connected to receive the previously described time difference detected output h from the previously described time difference detecting circuit 11 through an input terminal H and is also connected to provide a signal k of a time period associated with the previously described time difference detected output through a terminal K. The time period converting circuit 12 basically comprises an analogue switch 124, an amplifier 123, another amplifier 121 connected to a diode 127 and a capacitor 129 to constitute an integrating circuit, a further amplifier 122, and a gate 125. The driving signal generating circuit 13 is connected to receive the time period converted output k from the previously described time period converting circuit 12 through a terminal K and is also connected to provide a forward driving signal m and a reverse braking signal n through terminals M and N, respectively. The driving signal generating circuit 13 basically comprises an amplifier 131, another amplifier 132 and a gate 133. The motor driving circuit 24 is connected to receive the previously described forward driving signal m and the reverse braking signal n to provide a driving output to the motor 26 and basically comprises a transistor 141 for turning on/off a voltage being applied to the motor and transistors 142 to 145 for forward/reverse changing over the rotation of the motor.

FIG. 6 is a graph showing waveforms of electrical signals at various portions of the FIG. 5 diagram. Now with simultaneous reference to FIGS. 5 and 6, the still picture reproduction controlling circuit 29 and the motor driving circuit 24 will be described in the following.

Now it is assumed that the dropout signal x as shown as (b) in FIG. 6 is applied to the input terminal X, the head change-over signal y as shown as (a) in FIG. 3 and (c) in FIG. 6 is applied to the input terminal Y and the still picture reproduction mode signal z of the high level at the timing t0 as shown as (a) in FIG. 6 is applied to the input terminal Z in the time difference detecting circuit 11. It is further assumed that the tape has been brought to a stop at the timing t0. It is further assumed that the positions of the first and second magnetic heads travelling on the magnetic tape 1 are in the state of the loci 5a and 5b shown in FIG. 1B, in which case a noise band appears. It is further assumed that before and after the timing t0 the output Q of the flip-flop 13 is the low level and the output from the terminal "0" of the one shot multivibrator 114 is the high level. Then no change occurs in the circuit even if the head change-over signal y turns from the high level to the low level at the timing t1. When the head change over signal y is received, the signal is negative differentiated by the negative differentiation circuit 115 and the output therefrom is applied to the input R of the flip-flop 113. When the dropout signal x is applied to the input terminal X at the timing t2 as shown as (e) in FIG. 6, then the output of the gate 111 and thus the input to the input terminal S of the flip-flop 113 instantaneously fall to the low level as shown as (d) in FIG. 6, whereby the output Q of the flip-flop 113 becomes the high level as shown as (f) in FIG. 6. Simultaneously, the output $\overline{Q}$ becomes the low level as shown as (g) in FIG. 6, whereby the one shot multivibrator 114 is triggerred, so that the output "0" becomes the low level during a predetermined time period $\tau$, thereby to interrupt the input X of the gate. When the timing t4 is reached, the head change over signal y is applied to the terminal Y and the flip-flop 113 is reset, whereby the output Q is again turned to the low level. Then for a time period $\tau$, from the timing t2 the gate 11 is closed and therefore the time difference detecting circuit 11 is disabled.

A time period from t2 to t4, both inputs of the gate 112 are the high level and therefore the output therefrom is the low level. The time period converting circuit 12 is responsive to the output from the time difference detecting circuit 11 to be operable. The output h from the time difference detecting circuit 11 is shown as h in FIG. 6. While the output h is the high level, the diodes 126 and 127 are rendered conductive, so that the output of the operational amplifier 121 constituting together with the capacitor 129 an integrator remains a constant voltage which is slightly lower than the positive input terminal (a). Since the voltage at the point (b) is lower than the voltage at the point (a), the output of the amplifier 123 is the high level and accordingly the analogue switch 124 has been rendered conductive.

When the input to the terminal h turns to the low level after the lapse of the timing t2, the output from the amplifier 121 immediately increases through the resistor R1 of a low resistance and the diode 128 and the capacitor 129; however, the timing t3 is reached where the voltage at the point (b) exceeds the voltage at the point (a), the output from the amplifier 123 is interrupted and after the timing t3 the output voltage from the amplifier 121 increases through the resistor R2 of a high resistance and the diode 128 and the capacitor 129. When the timing t4 is reached the input to the terminal h becomes the high level and therefore the output voltage from the amplifier 121 gradually decreases through the resistor R3 and the diode 126 and the capacitor 129, so that the electric charge in the capacitor 129 becomes of the polarity opposite to that shown in FIG. 5, whereupon at the timing t6 the output from the amplifier 121 again becomes still. Such change of the output voltage from the amplifier 121 is shown as (i) in FIG. 6. The output from the comparator 122 becomes as shown as (j) in FIG. 6 and accordingly the output from the gate 125 becomes as shown as (k) in FIG. 6.

The output from the time difference detecting circuit 11, i.e. the time difference detected output as shown as (h) in FIG. 6, is thus processed by the time period converting circuit 12 and an output as shown as (k) in FIG. 6 of a time period as converted is obtained. The ratio of the convertion period is properly selected to be a value associated with the output from the time difference detected circuit 11 by means of the values of the resistors R1, R2 and R3 and the capacitor 129.

The driving signal generating circuit 13 operates as a function of the output (k) obtained from the above described gate 125 of the time period converting circuit 12. While the output (k) of the gate 125 is the low level, the output voltage from the amplifier 131 gradually increases through the resistor R6 and the capacitor 134 and when the output (k) of the gate 125 returns to the high level, similarly the output voltage from the amplifier 131 gradually decreases. Such change is shown as (l) in FIG. 6 and the output of the amplifier 132 remains the high level as shown as (m) in FIG. 6 until the timing t7 immediately before the timing t8 when the diode 135 is rendered conductive so that the output becomes still. Accordingly, the output from the gate 133 becomes as shown as (n) in FIG. 6. Now it is necessary to select the ratio of the period T1 from the timing t5 to the timing t6 and the period T2 from the timing t6 to the timing t7 such that T1>T2 and such selection of the ratio is made by selecting the resistance values of the resistors R4 and R5. The output (m) from the amplifier 132 is utilized as a forward driving signal of the motor and the output (n) from the gate 133 is utilized as a reverse braking signal of the motor. In the motor driving circuit 24 the voltage is applied to the motor through the transistor 141 and a change-over between the forward driving and the reverse braking is performed by means of the transistors 142 to 145.

Accordingly, during the time period T1 the motor is driven in the forward direction and during the time period T2 the motor is reverse braked. The ratio of the periods T1 and T2 is always constant notwithstanding the magnitude of the absolute values thereof and therefore the rotational amount of the motor is changed to be larger or smaller depending whether the time period T1 is larger or smaller. The period T2 is intended to stop the motor by decelerating the same by the amount of acceleration during the period T1 and therefore the motor is not reverse rotated.

The time difference detecting circuit 11 becomes again operable when the timing t9 is reached, when the output (h) is the low level during the period up to the timing t10, the output (k) from the time period converting circuit 12 changes as shown as (k) in FIG. 6, so that even if the outputs from the driving signal generating circuit 13 become as shown as (m) and (n) in FIG. 6 the motor shaft must remain just within the limit where the same is not rotated due to a static friction torque of the motor shaft. Assuming that the timer period between the timings t9 and t10 is small and a noise band has just been expelled from the television screen in such a situation, then the time period converting circuit 12 could be ideally adjusted by selecting the resistance value of the resistor R1 so that the period between the timings t2 and t3 and the time period between the timings t9 and t10 may be approximately equal to each other. The time period of the output (h) from the time difference detecting circuit 11 is changed depending on the position of a noise band on the television screen and the time period of the output (k) from the time period converting circuit 12 is also changeable depending on the magnitude of the time period of the output (h). Such time period is determined depending on the driving time of the capstan shaft driving motor and the time period is preferably changed by adjusting the resistance values of the resistors R2 and R3 so that a noise band may disappear from the upper end of the television screen through a single operation of motor driving depending on the position of such noise band on the screen.

The FIG. 5 embodiment was described as employing a direct current motor as the capstan shaft driving motor. However, alternatively a brushless motor may be equally utilized for the same purpose. Although in such a case the motor driving circuit 14 would also be accordingly different, the same purpose can be readily achieved by making the output (m) from the driving signal generating circuit 13 correspond to a current driving signal of a motor and by making the output (n) of the driving signal generating circuit 13 correspond to a forward/reverse switching signal. Meanwhile, although a direct drive motor was employed as the capstan shaft driving motor, a belt drive motor may also be utilized for the same purpose.

Figure 7A:
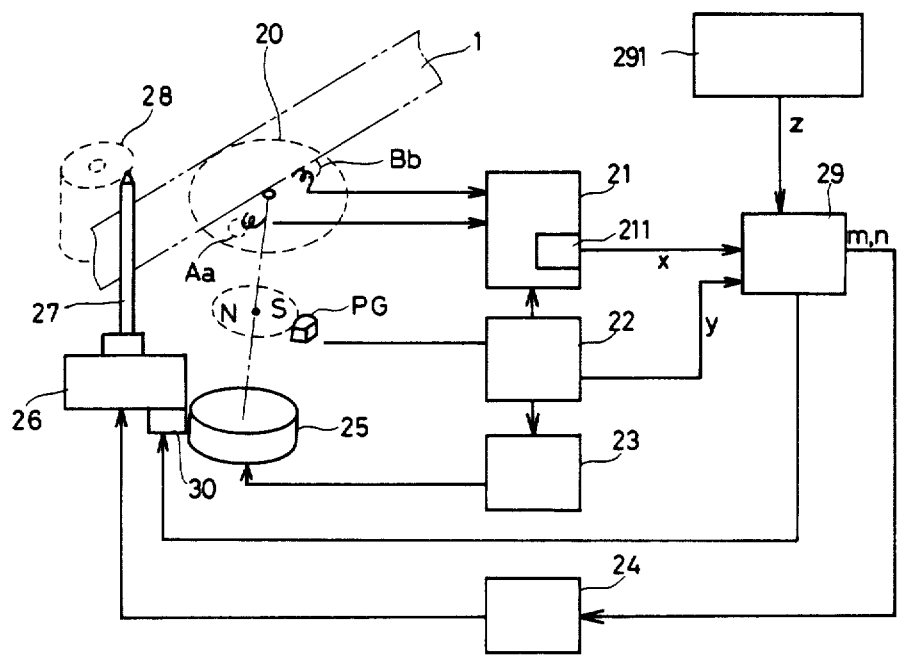
FIG. 7A is a block diagram of another embodiment of the present invention.

FIG. 7A is a block diagram of another embodiment of the present invention. Since the FIG. 5 embodiment was adapted such that the ratio of the forward driving time period T1 and the reverse braking time period T2 may be constant, more precisely the capstan shaft driving motor 12 has not necessarily been brought to a stop at the time point when the reverse braking period T2 was terminated for a different value of the forward driving period T1 and this means that there is a possibility in which a noise band appears on the screen at the position deviated in the forward direction or the reverse direction. The FIG. 7A embodiment was implemented in consideration of the foregoing and comprises a braking mechanism 30 provided to the capstan shaft driving motor 26 so that the same may be operable on the occasion of a still picture reproduction mode. By making the above described braking mechanism operable, rotation is immediately suppressed, even when there remains a slight rotation of the capstan shaft driving motor 26 shortly after termination of braking, whereby the purpose of the invention can be achieved with better accuracy.

Figure 7B:
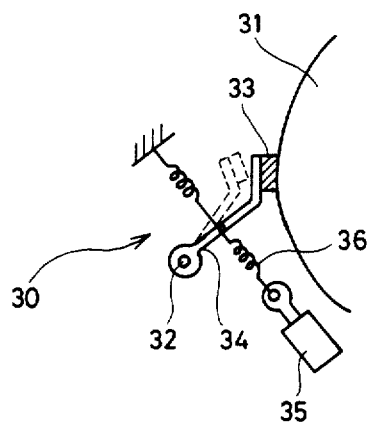
FIG. 7B is a view showing one example of the braking mechanism.

FIG. 7B is a view showing one example of the braking mechanism 30. Referring to FIG. 7B, the braking mechanism 30 is provided adjacent to a rotational magnetic disc 31 provided in a plane normal to the capstan shaft 27 and comprises a supporting member 34 with a brake pad 33 rotatably provided to a stationary shaft 32. When a solenoid is in a disabled state, the supporting member 34 is urged to the position by the dotted line by means of a spring 36, so that the brake pad 33 is not in contact with the rotational magnetic disc 31. When the solenoid 35 is enabled, the spring 36 is pulled so that the supporting member 34 is brought to the position shown by the solid line, whereby the braking pad 33 is brought to be in normal contact with the rotational magnetic disc 31 with a predetermined contacting pressure. In such a situation the motor can be provided with a normally constant braking force to the rotation.

Although the present invention has been described and illustrated in detail, it is clearly understood that the same is by way of illustration and example only and is not be taken by way of limitation, the spirit and scope of the present invention being limited only by the terms of the appended claims.

What is claimed is:

1. A magnetic video reproducing apparatus employing a rotational plural-head system including at least two video heads, a helical scan system and an azimuth system, comprising:
    capstan driving means,
    position detecting means for detecting and producing an output indicative of the positions of said at least two magnetic heads,
    dropout detecting means for detecting and producing an output indicative of a decrease in signal level of a reproduced signal output from said at least two magnetic heads, and
    control means responsive to said position detecting means and said dropout detecting means for driving said capstan driving means for causing said decrease of the level of said reproduced signal output to be close to a change over between said at least two magnetic heads,
    said control means comprising:
    time difference detecting means responsive to said position detecting means and to said dropout detecting means for detecting and producing an output indicative of a time difference between the outputs from said position detecting means and from said dropout detecting means,
    time period converting means responsive to said time difference detecting means for converting the output therefrom to an output signal of a time period associated with said output from said time difference detecting means, and
    driving means responsive to the output signal from said time period converting means for driving said capstan driving means,
    said driving means adapted for determining the driving amount of said capstan driving means responsive to the time period of the output signal from said time period converting means,
    said time period converting means producing a period for its output signal adapted to cause the decrease of the signal level of said reproduced signal output to be close to said change over between said at least two magnetic heads.

2. A magnetic video reproducing apparatus in accordance with claim 1, wherein
    said driving means comprises
        driving signal generating means for generating a forward driving signal for driving said capstan driving means in the forward direction and a reverse braking signal for braking said capstan driving means in the reverse direction, and
        driving circuit means responsive to said driving signal generating means for driving said capstan driving means in the forward direction as a function of said forward driving signal and for reverse braking said capstan driving means as a function of said reverse braking signal.

3. A mgnetic video reproducing apparatus employing a rotational plural-head system including at least two video heads provided on the circumference of a rotational drum equispaced apart from each other and producing output signals, and drum driving means for rotating said rotational drum, a helical scan system for causing a recording medium to travel obliquely with respect to the rotational direction of said at least two video heads, and an azimuth system in which said at least two video heads each having a gap are provided such that gaps of said at least two video heads extend with angles intersecting each other, said magnetic video reproducing apparatus comprising:
    a capstan for mechanically causing said recording medium to travel,
    capstan driving means for mechanically driving said capstan, head position detecting means coupled to said rotational drum for detecting and producing an output indicative of the positions of said at least two video heads, dropout detecting means operatively coupled to said at least two video heads for detecting and producing an output indicative of a decrease in output signal level from said at least two video heads, and control means responsive to said position detecting means and said dropout detecting means for driving said capstan driving means for causing said decrease of the level of said reproduced signal output to be close to a change over between said at least two magnetic heads, said control means comprising:

time difference detecting means responsive to said position detecting means and to said dropout detecting means for detecting and producing an output indicative of a time difference between the outputs from said position detecting means and from said dropout detecting means, time period period converting means responsive to said time difference detecting means for converting the output therefrom to an output signal of a time period associated with said output from said time difference detecting means, and driving means responsive to the output signal from said time period converting means for driving said capstan driving means, said driving means adapted for determining the driving amount of said capstan driving means responsive to the time period of the output signal from said time period converting means, said time period converting means producing a period for its output signal adapted to cause the decrease of the signal level of said reproduced signal output to be close to said change over between said at least two magnetic heads.

4. A magnetic video reproducing apparatus in accordance with claim 3, wherein said driving means comprises driving signal generating means for generating a forward driving signal for driving said capstan driving means in the forward direction and a reverse braking signal for braking said capstan driving means in the reverse direction, and driving circuit means responsive to said driving signal generating means for driving said capstan driving means in the forward direction as a function of said forward driving signal and for reverse braking said capstan driving means as a function of said reverse braking signal.

5. A magnetic video reproducing apparatus in accordance with claims 1 or 2, wherein said position detecting means comprises sensor means including a magnet coupled to said at least two magnetic heads and a sensor operatively associated with said magnet.

6. A magnetic video reproducing apparatus in accordance with claims 1 or 2, which further comprises mechanical braking means responsive to said control means for braking said capstan driving means.

7. A magnetic video reproducing apparatus in accordance with claims 3 or 4, wherein said position detecting means comprises sensor means including a magnet coupled to said at least two magnetic heads and a sensor operatively associated with said magnet.

8. A magnetic video reproducing apparatus in accordance with claims 3 or 4, which further comprises mechanical braking means responsive to said control means for braking said capstan driving means.

* * * * *